US006890259B2

(12) United States Patent

Breckner et al.

(10) Patent No.: US 6,890,259 B2

(45) Date of Patent: May 10, 2005

(54) MODULAR TILT HANDLING SYSTEM

(75) Inventors: Robert E. Breckner, Sparks, NV (US); Bryan Wolf, Reno, NV (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 258 days.

(21) Appl. No.: 09/954,816

(22) Filed: Sep. 10, 2001

(65) Prior Publication Data

US 2003/0130026 A1 Jul. 10, 2003

(51) Int. Cl.[7] .............................. A63F 13/00; A63F 9/24

(52) U.S. Cl. .............................. 463/29; 463/16; 463/20; 463/40; 463/41; 463/42

(58) Field of Search .............................. 463/1, 16–29, 463/40–42

(56) References Cited

U.S. PATENT DOCUMENTS

| | | | | | |
|---|---|---|---|---|---|
| 3,931,504 | A | | 1/1976 | Jacoby | 235/153 |
| 4,430,728 | A | | 2/1984 | Beitel et al. | 364/900 |
| 4,454,594 | A | | 6/1984 | Heffron et al. | 364/900 |
| 4,727,544 | A | * | 2/1988 | Brunner et al. | 463/29 |
| 5,496,032 | A | * | 3/1996 | Okada | 463/25 |
| 5,611,730 | A | * | 3/1997 | Weiss | 463/20 |
| 5,655,961 | A | * | 8/1997 | Acres et al. | 463/27 |
| 5,833,540 | A | * | 11/1998 | Miodunski et al. | 463/42 |
| 5,851,149 | A | | 12/1998 | Xidos et al. | 463/42 |
| 5,919,091 | A | * | 7/1999 | Bell et al. | 463/25 |
| 5,971,851 | A | | 10/1999 | Pascal et al. | 463/24 |
| 6,099,408 | A | | 8/2000 | Schneier et al. | 463/29 |
| 6,152,824 | A | * | 11/2000 | Rothschild et al. | 463/42 |
| 6,253,374 | B1 | | 6/2001 | Dresevic et al. | 717/11 |
| 6,383,077 | B1 | * | 5/2002 | Kweitko et al. | 463/40 |
| 6,409,602 | B1 | * | 6/2002 | Wiltshire et al. | 463/42 |
| 6,446,257 | B1 | | 9/2002 | Pradhan et al. | 717/154 |
| 6,449,687 | B1 | | 9/2002 | Moriya | 711/112 |
| 6,453,319 | B1 | | 9/2002 | Mattis et al. | 707/100 |
| 6,454,648 | B1 | | 9/2002 | Kelly et al. | 463/16 |
| 6,595,856 | B1 | * | 7/2003 | Ginsburg et al. | 463/29 |

FOREIGN PATENT DOCUMENTS

| | | | |
|---|---|---|---|
| EP | 1255234 A2 | 6/2002 | G07F/17/32 |
| WO | WO 02/073501 | 9/2002 | G06F/19/00 |

* cited by examiner

*Primary Examiner*—Xuan M. Thai
*Assistant Examiner*—Robert Mendoza
(74) *Attorney, Agent, or Firm*—Beyer, Weaver & Thomas LLP

(57) ABSTRACT

A modular tilt handling system for controlling how tilts are declared, displayed and cleared in a gaming machine. The modular tilt handling system includes a plurality of gaming software elements that allow the gaming system to detect events and to generate one or more tilts in response to the one or more events in accordance with the regulations of a gaming jurisdiction. The modular tilt handling system treats events separately from tilts so that tilts can be dynamically configured for different gaming jurisdictions.

74 Claims, 6 Drawing Sheets

MODULAR TILT HANDLING SYSTEM

FIELD OF THE INVENTION

This invention relates to gaming machines, such as slot machines and video poker machines. More particularly, the present invention relates to methods of handling tilts in gaming machines.

BACKGROUND OF THE INVENTION

Gaming machines typically include various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill acceptors and coin acceptors, to accept money into the gaming machine and recognize user inputs from devices, such as key pads and button pads, to determine the wager amount, and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines, such as via an intranet or the Internet. As technology in the gaming industry progresses, more and more gaming services are being provided to gaming machines using a client-server model. In a client-server model, groups of gaming machines are linked via a dedicated communication network of some type to a remote computer that provides one or more gaming services using the dedicated communication network.

There are wide varieties of associated devices that can comprise a gaming machine, such as a slot machine or video poker machine. Some examples of these devices are lights, coupon dispensers, card readers, bill acceptors, coin acceptors, coin hoppers, display panels, key pads, light bezels, button panels, communication devices, cameras, input devices, security detection circuitry, amplifiers, cash-in/cash-out devices, meters, power supplies, and gaming controllers. Many of these devices are built into the gaming machine while some are grouped into separate units, such as top boxes that may be placed on top of the machine.

Some gaming machine devices are considered more critical to the gaming machine operations than others are. In particular, devices that control the input and output of money from the gaming machine are generally considered critical devices. The master gaming controller, which controls the features of the game played on the gaming machine including the pay-out of a particular game as well as the gaming devices which output game pay-outs, is one of the most critical gaming devices, if not the most critical device. Specific examples of other critical devices include card readers, bill acceptors, ticket coupon readers, and coin acceptors which control the input of money into the gaming machine and note stackers, token dispensers, drop boxes and ticket/coupon dispensers which control the output of money from the gaming machine.

Access to a particular gaming machine device depends on the type of device. Input devices, such as bill acceptors, coin acceptors, and card readers, or output devices, such as coupon dispensers or token dispensers, are directly accessible. These devices have at least one access mechanism on the outside of the gaming machine so that the gaming machine may either accept money or indicia of credit from players desiring to play the game or pay-out money to a player playing a game. However, access to the mechanisms controlling the operation of these devices is usually behind one or more doors provided on the gaming machine exterior. The gaming controller and the money storage devices, such as bill stackers and drop boxes, are less accessible. These devices are usually only accessible after opening one or more doors or other barriers that limit access to these critical devices.

The doors that allow access to the critical devices are often secured with keyed locks. For security, when any of these doors are opened, the gaming machine must stop normal game play operation and switch to an attention state. Thus, it is necessary to detect whether a door is open or closed via an electronic means so that the operating software utilized by the gaming controller can take appropriate action.

Another access mechanism to gaming devices including bill acceptors, coin acceptors, token dispensers, gaming controllers, and coupon dispensers is through wires which accept and transmit signals which control the operation of the device. Typically, during the operation of the gaming machine, many of the associated gaming devices are controlled in some manner by a gaming controller located within the gaming machine. The control of a gaming device is enabled by the wires that connect a gaming device to the gaming controller. For example, when a player is playing a game and receives a pay-out during the course of a game, the gaming controller may send out a signal to a coupon dispenser, located in some other part of the gaming machine away from the gaming controller, instructing the coupon dispenser to dispense a coupon representing the pay-out. Thus, access may be gained to a gaming device, via the wires connected to the gaming device.

A common mode of theft for gaming machines involves accessing the devices which control the input and output of money to the gaming machine through some access mechanism and manipulating the devices in some manner to obtain an illegal pay-out. For example, one type of theft might involve simply taking money from a drop box while a gaming machine is being accessed for maintenance. Another type of theft might involve illegally gaining access to the master gaming controller and reprogramming the master gaming controller to payout an illegal jackpot. Another type of theft might involve compromising the wires to a coupon dispenser and sending a signal instructing it to dispense coupons with some monetary value.

Security monitoring of access to the gaming machine is usually implemented in some manner by the master gaming controller during normal operations of the gaming machine in conjunction with some security monitoring hardware independent of the master gaming controller. The security monitoring by the master gaming controller is implemented while the gaming machine is receiving power from an external power source, such as AC power from a power outlet. In the event the gaming machine is receiving no external power, such as during a power failure or when the gaming machine is being stored or shipped, security monitoring of the gaming machine is carried out only by the independent security monitoring hardware powered by an internal power source within the gaming machine, such as battery.

In the gaming industry, power loss, hardware malfunctions, software malfunctions, a player trying to cheat a machine, attempts at theft or tampering of the gaming machine, or other circumstances that require an operator's attention can result in a "tilt". For example, a bill acceptor jam, a door on the gaming machine being opened, or a loss of power may cause a tilt on a gaming machine. Tilts are sometimes referred to as "hard" tilts or "soft" tilts. Hard tilts typically result in the machine being placed in a lock-out state where no further game play can occur and operator intervention is required to reset the machine so that game play can resume. Soft tilts typically allow game play to continue but may alert an attendant and/or may result in some functions not being available to a player. For example, a jam in the bill acceptor may disable acceptance of paper bills as a pay form, but acceptance of coins or others forms of credit may continue to be accepted so that game play continues.

Typically, the declaration, handling and clearing of a tilt is governed by the rules of the gaming jurisdiction in which the gaming machine is located. Frequently, one gaming jurisdiction may require a tilt to be declared, handled and cleared differently from another gaming jurisdiction. For example, some gaming jurisdictions require a malfunction to be declared a tilt immediately. Others prefer to let the malfunction clear itself, and, if unable to do this over a specified period of time, to declare a tilt.

To comply with the requirements of a particular gaming jurisdiction, conventionally, gaming machines are individually customized. Typically, this requires that jurisdictionally customized programming be developed and loaded into each machine so that a tilt is declared under the proper circumstances. Generally, this is designed so that the events that result in a tilt and the tilt are defined together. Thus, if jurisdictional changes are required, extensive code revision can be required. This method is costly in terms of program development and installation. Further, if the machine is moved to a different gaming jurisdiction, or if the requirements change, the machine must then be individually loaded with entirely new programming that is customized for that gaming jurisdiction.

In view of the above, it would be desirable to have a method for handling tilts in a more flexible and configurable manner that is less costly in terms of programming development and installation time.

SUMMARY OF THE INVENTION

This invention addresses the needs indicated above by providing a modular tilt handling system for controlling the declaration, clearing and display of tilts in a gaming system.

One aspect of the present invention provides a gaming machine including the modular tilt handling system. The gaming machine may be generally characterized as including: a master gaming controller designed or configured to control one or more games played on the gaming machine; a plurality of gaming devices connected to the gaming machine and in communication with the master gaming controller wherein at least one of the gaming devices generates an event in response to one or more event conditions generated by the gaming device; and, a memory configured to store a modular tilt handling system that is dynamically configurable, the modular tilt handling system comprising a plurality of gaming software elements that allow the master gaming controller to detect events and to generate one or more tilts in response to one or more events wherein the modular tilt handling system is dynamically configured to generate tilts according to the regulations of a gaming jurisdiction in which the gaming machine is operating.

Another aspect of the present invention includes a method for generating tilts on a gaming machine. The method may be generally characterized as including: loading into RAM one or more game software elements to respond to an event according to the requirements of a gaming jurisdiction in which the gaming machine is operating; receiving an event from at least one of a gaming device, a sensor connected to sensor monitoring circuitry and a game software element; executing the one or more game software elements in RAM; and, declaring a tilt.

Another aspect of the present invention includes a method for declaring a tilt resulting from an event generated in a gaming machine. The method may be generally characterized as including: receiving an event at a tilt controller; communicating the event from the tilt controller to a tilt manager, the tilt manager further comprising a tilt handler list and a tilt list, the tilt handler list including a list of tilt handlers associated with the tilt manager, the tilt list including a list of tilts that have not been cleared in the gaming machine; communicating the event from the tilt manager to at least one tilt handler on the tilt handler list; communicating the event from the tilt handler to at least one event handler; creating a tilt object by the event handler in response to the event that is in accordance with the regulations of a gaming jurisdiction in which the gaming machine is operating; communicating a tilt interface from the tilt handler to the tilt manager, the tilt interface providing a handle back to the tilt object; identifying the tilt object on the tilt list; and, updating a tilt presentation loaded by the tilt manager to include display of information associated with the tilt.

Another aspect of the present invention provides a method for clearing a tilt declared on a gaming machine. The method may be generally characterized as including: receiving an event at a tilt controller; communicating the event from the tilt controller to a tilt manager, the tilt manager further including a tilt handler list and a tilt list, the tilt handler list including a list of tilt handlers associated with the tilt manager, the tilt list including a list of tilts that identify tilt objects that have not been cleared in the gaming machine; communicating the event from the tilt manager to each of the tilt objects identified as tilts on the tilt list; updating the state of each tilt object based upon the event and in accordance with the regulations of a gaming jurisdiction; querying the tilt object by the tilt manager to determine if the tilt object is cleared; communicating that the tilt object is cleared in response to a query from the tilt manager; removing the tilt identifying the cleared tilt object from the tilt list; and, updating a tilt presentation loaded by the tilt manager to include an updated display of information associated with any remaining tilts.

Another aspect of the present invention provides a gaming machine network. The gaming machine network may be generally characterized as including: a plurality of file storage devices storing gaming software programs; a plurality of gaming machines; and a network allowing communication between the file storage devices and the plurality of gaming machines. The gaming machines in the game network may be characterized as including: a master gaming controller configured to control one or more games played on the gaming machine; a plurality of gaming devices connected to the gaming machine and in communication with the master gaming controller wherein at least one of the gaming devices generates an event in response to one or more event conditions generated by the gaming device; and, a memory configured to store a modular tilt handling system comprising a plurality of gaming software elements that allow the master gaming controller to detect events and generate one or more tilts in response to the one or more events in accordance with the regulations of a gaming jurisdiction. The modular tilt handling system may include: a tilt controller for communicating events generated in the gaming machine to a tilt manager that is responsible for declaring, displaying, and clearing tilts resulting from the events; at least one tilt handler in communication with the tilt manager that is configured to generate one or more tilt objects in response to an event; and, a tilt presentation in communication with the tilt manager that is configured to present tilt related data for display on the gaming machine.

Another aspect of the present invention pertains to computer program products including a computer readable medium on which is stored program instructions for implementing any of the methods described above.

These and other features of the present invention will be presented in more detail in the following detailed description of the invention and the associated figures.

DESCRIPTION OF THE PREFERRED EMBODIMENTS

The present invention provides a tilt handling system for controlling how tilts are declared, displayed and cleared in a gaming machine or a gaming system, such as a gaming network connecting a plurality of gaming machines. In the present invention, a modular tilt handling system on a gaming machine treats events and tilts separately so that tilts can be dynamically configured according to the regulations of each gaming jurisdiction in which the gaming machine is operating. Further, the gaming software elements for the modular tilt handling system are modular and dynamically configurable. Thus, different combinations of executable gaming software elements may be dynamically loaded to RAM and may be unloaded from RAM to respond to tilts according to the requirements of a particular gaming jurisdiction. In this way, specific device drivers do not need to know the gaming jurisdiction for which the gaming machine is configured, what constitutes a tilt, how it is displayed, or how it is cleared. For example, in one gaming jurisdiction, an event may not constitute a tilt until a certain amount of time has passed, a button sequence completed, etc.

Separating an event from a tilt in the context of a modular and dynamically configurable gaming software architecture, allows the conditions that specify a tilt to be varied from jurisdiction to jurisdiction independent of the event. This results in a more flexible and configurable handling of tilts over current methods. In past gaming machines, a single executable for the gaming software has been typically burnt on to an EPROM, and executed from the EPROM, to allow a game to be played on the gaming machine. When tilt handling requirements for a particular tilt are changed in a gaming jurisdiction, the entire EPROM is replaced, which is costly and time consuming. An advantage of the present invention is that, when tilt handling requirements for a particular tilt are changed in a gaming jurisdiction, it is only necessary to update a gaming software module for handling the tilt rather than replacing an entire EPROM.

Figure 1:
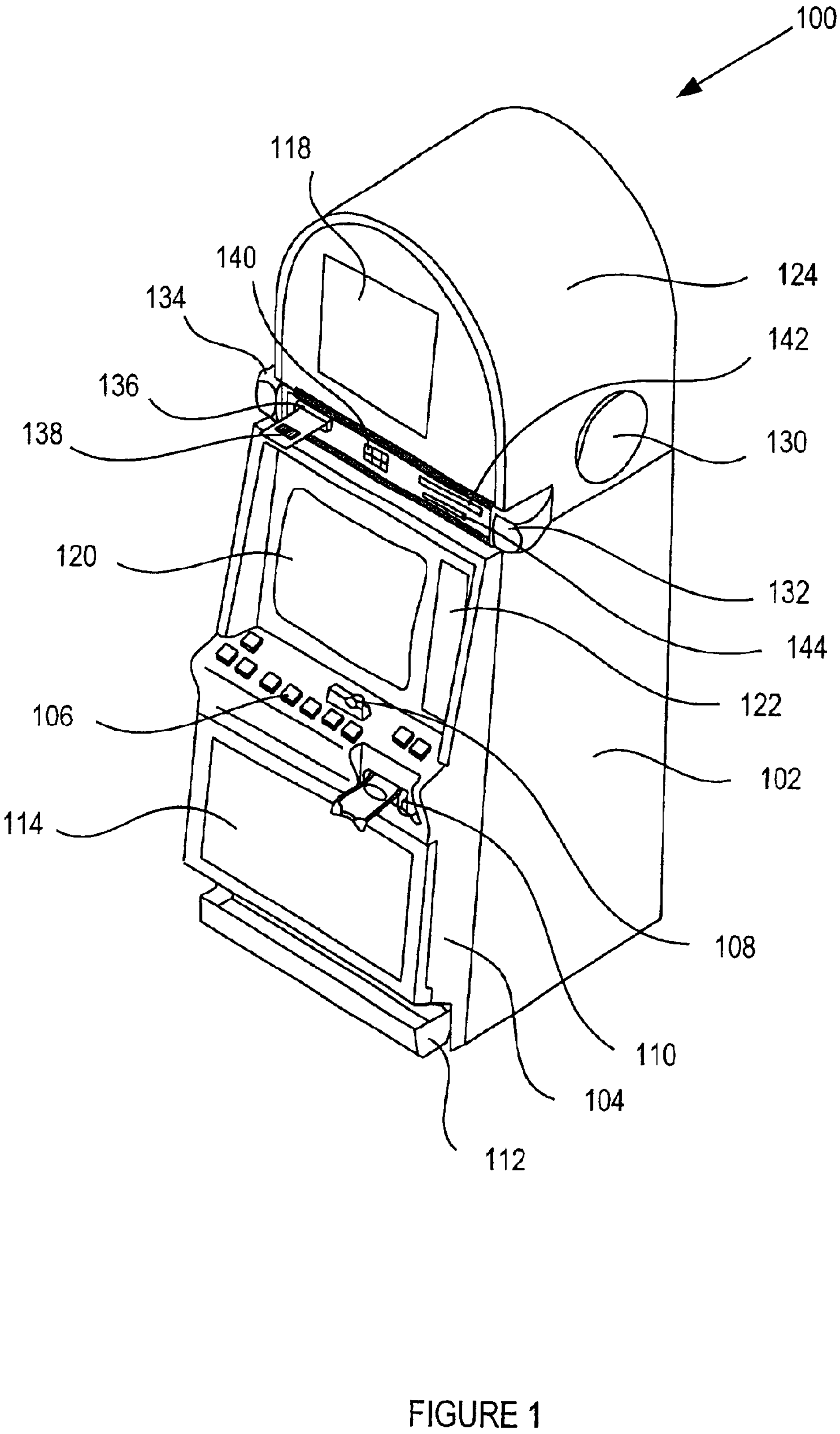
FIG. 1 is an illustration of a gaming machine including a modular tilt handling system according to one embodiment of the present invention.

FIG. 1 is an illustration of a gaming machine 100 including a modular tilt handling system according to one embodiment of the present invention. Gaming machine 100 includes a main cabinet 102, which generally surrounds the machine interior (not shown) and is viewable by users. The main cabinet 102 includes a main door 104 on the front of the machine, which opens to provide access to the interior of the machine.

The interior of the machine 100 typically houses the circuitry (e.g., a master gaming controller) and gaming machine software, including the modular tilt handling system of the present invention, utilized in running the gaming machine 100 as well as the cash boxes. Typically, the main door 104 and/or any other portals which provide access to the interior of the machine 100 utilize a locking mechanism of some sort as a security feature to limit access to the interior of the gaming machine. Also, for further security, various types of sensors may be employed at these entry portals to determine when an access has occurred. For example, the sensor may detect when the door is actuated from a closed position to an open position. Monitoring of these sensors may be carried out by hardware (not shown) located within the main cabinet 102. Attached to the main door are player-input switches 106, a coin acceptor 108, and a bill acceptor 110, a coin tray 112, a belly glass 114, and a monitor mask 118. The belly glass 114 has a door for maintenance purposes, such as changing the glass or lights. This portal may provide indirect access to the interior of the gaming machine. For example, gaps may exist in the cabinet containing the lights for the belly glass.

Viewable through the main door is a video display monitor 120 and an information panel 122. The display monitor 120 will typically be a cathode ray tube, high resolution flat-panel LCD, or other conventional electronically controlled video monitor. The information panel 122 is a backlit, silk-screened glass panel with lettering to indicate general game information including, for example, the number of coins played. The bill acceptor 110, player-input switches 106, video display monitor 120, and information panel 122 are devices used to play a game on the game machine 100. The devices are controlled by circuitry (not shown) housed inside the main cabinet 102 of the machine 100. Many possible games of chance and skill may be provided with the gaming machines of the present invention, including video slot games, mechanical slot games, video black jack games, video poker games, video keno games, video bingo games, video pachinko games, video card games, video games of chance, video games of skill, and combinations thereof.

The gaming machine 100 includes a top box 124, which sits on top of the main cabinet 102. The top box 124 houses a number of devices including speakers 130, 132, 134, a coupon dispenser 136 which prints bar-coded tickets 138, a key pad 140 for entering player tracking information, a fluorescent display 142 for displaying player tracking information, and a card reader 144 for entering a magnetic striped card containing player tracking information. The top box 124 may contain an entry portal of some type (not shown) to access the devices contained within the top box. This entry portal may contain a lock and sensors for monitoring access to the portal. Further, access to devices within the top box 124 may be monitored. For example, the coupon dispenser 136 may be used to print tickets for game credits. The coupon dispenser (not shown) may contain a door that allows access to the tickets utilized by the coupon dispenser. This entry portal may contain a lock and sensors for monitoring access to the portal.

Further, the top box 124 may house different or additional devices. For example, the top box may contain a bonus wheel or a backlit silk-screened panel that may be used to add bonus features to the game being played on the gaming machine. During a game, these devices are controlled, in part, by circuitry (not shown) housed within the main cabinet 102 of the machine 100. Further, additional circuitry (not shown) housed within the main cabinet 102 may monitor access to the top box 124 and possibly some devices within the top box 124. Cables (not shown) are routed from the top box 124 to the interior of the gaming machine 100 to enable these control and monitoring functions.

When a user wishes to play the gaming machine 100, he or she inserts cash through the coin acceptor 108 or bill acceptor 110. In addition, the player may use a cashless instrument of some type to register credits on the gaming machine 100. For example, the bill acceptor 110 may accept a printed ticket voucher, including ticket 138, as indicia of credit. As another example, the card reader 144 may accept a debit card or a smart card containing cash or credit information that may be used to register credits on the gaming machine.

The cash or game tokens from the coin acceptor 108 and bill acceptor 110 may be stored in the interior of the main cabinet 102 in devices including note stackers, drop boxes, and token dispensers. At the start of the game, the player may enter player tracking information using the card reader 144, the keypad 140, and the florescent display 142. During the game, the player views game information using the video display 120. Usually, during the course of a game, a player is required to make a number of decisions, which affect the outcome of the game. The player makes these choices using the player-input switches 106. During certain game events, the gaming machine 100 may display visual and auditory effects that can be perceived by the player. These effects add to the excitement of a game, which makes a player more likely to continue playing. Auditory effects include various sounds that are projected by the speakers 130, 132, 134. Visual effects include video, flashing lights, strobing lights, or other patterns displayed from lights or displays on the gaming machine 100. After the player has completed a game, cash or a cashless instrument may be generated at the gaming machine 100. The cashless instrument may be a printed ticket voucher, a smart card, a debit card or other cashless medium. Further, the player may receive a ticket 138 for food, merchandise, or games from the printer 136.

It will be appreciated that gaming machine 100 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill acceptor, coin acceptors and coin trays. Instead, they may have only ticket readers, card readers and ticket dispensers. As another example, a game may be generated on a host computer and may be displayed on a remote terminal or a remote computer. The remote computer may be connected to the host computer via a network of some type, such as an intranet or the Internet. Those of ordinary skill in the art will understand that the present invention, as described below, can be deployed on most any gaming machine now available or hereafter developed.

Figure 2:
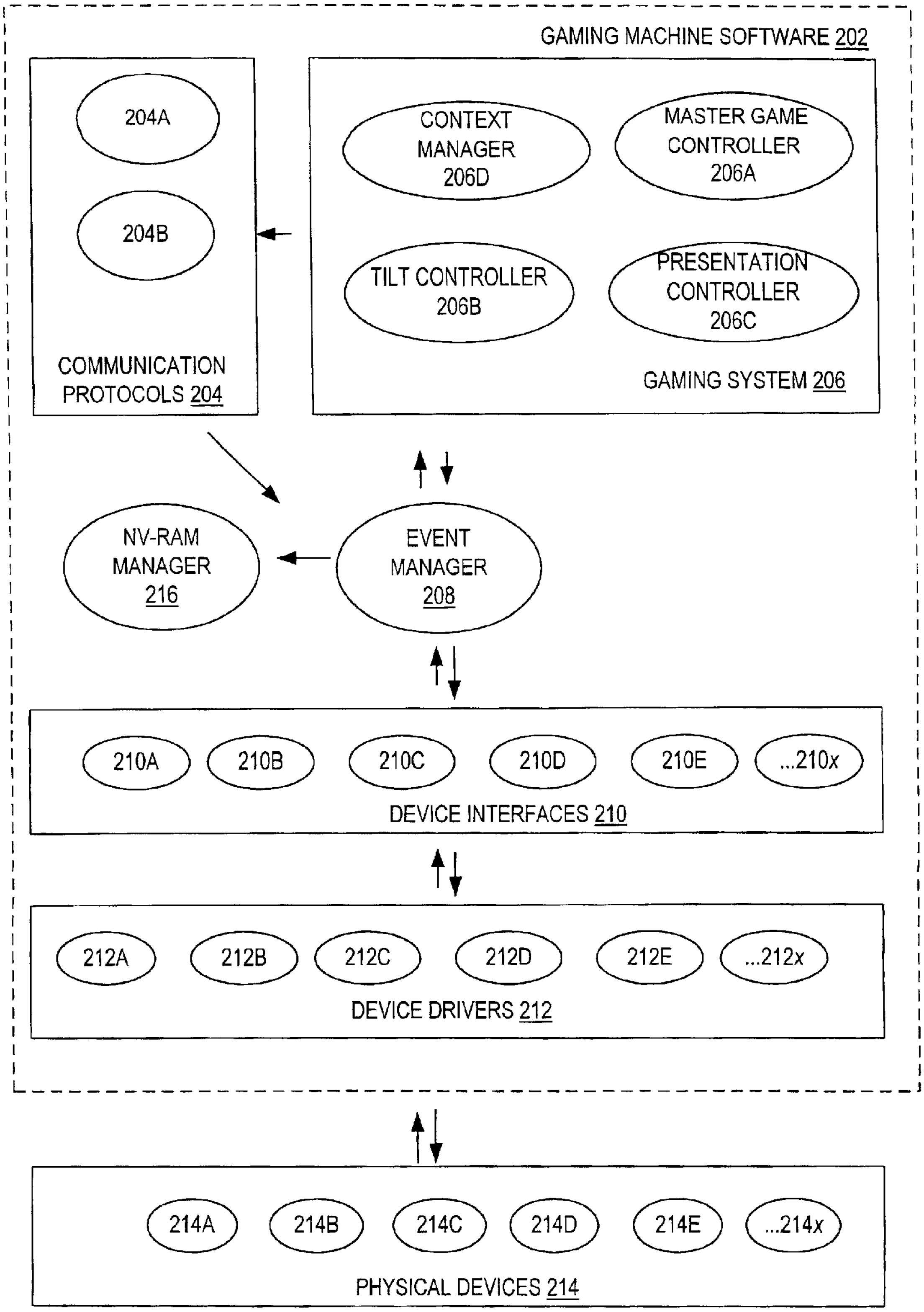
FIG. 2 is a block diagram illustrating gaming machine software elements in a gaming machine with a modular tilt handling system according to one embodiment of the present invention.

FIG. 2 is a block diagram illustrating gaming machine software elements in a gaming machine with a modular tilt handling system according to one embodiment of the present invention. Various hardware and software architectures may be used to implement this invention and are not limited to the architecture described with respect to FIG. 2. For example, while currently many architectures store the gaming machine software on a storage device, for example, on a hard disk, in the gaming machine, it will be appreciated that the present invention can also be stored elsewhere, for example, at a gaming server, and then distributed and executed by an individual gaming machine. This distribution may be over an intranet system or may be over an internet system, such as the Internet, or other global or regional transmission system.

The main elements of the gaming machine software 202 are communication protocols 204, a gaming system 206, an event manager 208, device interfaces 210, and device drivers 212. The gaming machine software 202, which includes various gaming software elements, is typically executed by the master gaming controller on a gaming machine. The device drivers 212 communicate directly with the physical devices 214 including a monitor 214A, a key pad 214B, a display 214C, a card reader 214D, security devices 214E, which may include door opening detection devices or a web or halter system which can detect openings, jams, or other access to the gaming machine, or any other physical devices 214*x* that may be used to provide gaming services.

The device drivers 212 utilize communication protocols of some type that enable communication with a particular physical device 214. Examples of communication protocols used to implement the device drivers 212 include Netplex, USB, IEE1394, Serial, Ethernet, Firewire, I/O debouncer, direct memory map, serial, PCI, or parallel. Netplex is proprietary IGT standard while the others are open standards.

The device drivers 212 may vary depending on the manufacturer of a particular physical device and generally act to abstract the hardware implementation of a device.

The device interfaces 210 may include interfaces for a monitor 210A, a key pad 210B, a display 210C, a card reader 210D, security devices 210E, or any other device interfaces 210*x* that may be used in provide gaming services. The device interfaces 210 interface between the various physical devices 214 and the various units of the gaming machine software 202. Once a device interface 210 has received an event from a physical device 214, the event is posted to the event manager 208.

The event manager 208 is typically a shared resource that is utilized by all of the software applications in the gaming system 206 including the tilt controller 206B of the present invention. The event manager 208 evaluates each event to determine whether the event contains critical information that is protected from power hits on the gaming machine. Events containing critical information may be sent to the non-volatile memory manager 216 for storage in non-volatile memory. The non-volatile memory manager 216 may also be shared by other applications. The event manager 208 may also maintain an event log. An event log is a queue of the most recent events in the gaming machine/gaming system and may also be stored in non-volatile memory. Events may be automatically added to the event log as soon as they are distributed. In some embodiments, the event log may be displayed in text form for viewing, for example, by an attendant.

Since the source of an event, for example, a device interface 210 or a server outside of the gaming machine, is not usually directly connected to the event destination, the event manager 208 acts as an interface between the event source and the one or more event destinations. After the event source posts the event, the event source returns back to performing its intended function. For example, the event source may be a device interface 210 polling a hardware device 214. The event manager 208 processes the event posted by the event source and places the event in one or more queues for delivery. As an example, the event manager 208 may prioritize each event and place it in a different queue depending on the priority assigned to the event.

The gaming system 206 includes many different components of which only a few are illustrated in connection with the present invention. The master game controller 206A controls the game flow on the gaming machine, and controls what needs to be displayed during a game. It can implement one game or several games on a gaming machine. Where there are several games, the master game controller may implement the various game flows in association with game managers, which control game flow for each individual game. The master game controller 206A communicates what needs to be displayed during a game to the presentation controller 206C.

The presentation controller 206C controls the actual display on the gaming machine. It loads displays, for example, through a presentation extension that can render to a graphics card. Where there are several games on a gaming machine, there can be several presentation managers that implement displays associated with a particular game.

The context manager 206D also communicates with the presentation controller 206C. The context manager 206D arbitrates requests from the different display components within the gaming system and determines which entity is given access to the display screen based on priority settings. Examples of different contexts may include menu, tilt, game, attract, and main menu. At any given time, multiple entities may try to obtain control of the screen display. For example, a tilt display may get higher display priority than a particular game display when a tilt occurs and the gaming machine is in an active tilt context.

The active context also receives notification of events that enable it to handle user input. The context manager 206D queries each context as to whether it can be entered or exited. This enables the context manager 206D to determine which entity receives control, based on the status of each context within the gaming machine. The context manager 206D may change the active context when the current context has completed its information display, or the status of a context changes and it posts an event to request control. When a context's state changes, it must update its internal logic to report whether it can be entered and exited. It must also post an information event to notify the context manager 206D to assign a new active context.

When the context manager 206D processes the new context request, it runs through the entire list of context from highest to lowest priority and determines which context to activate. This may be done by querying each context to determine if it can be entered. When a new context is found, the old one is exited and the new one is entered causing the old display to be replaced by the new.

The tilt controller 206B also communicates with the presentation controller 206C and receives events from the event manager 208 which it then distributes to other elements of the modular tilt handling system of the present invention to enable the control of the declaration and handling of tilts in the gaming system as further described herein.

After an event is received by the event manager 208, the event is broadcast to the software units of the gaming machine software 202 that may operate on the event, and may also be broadcast to software units located outside of the gaming machine. For example, when a bill acceptor jam occurs, this event may pass through a device driver 212 through the device interface 210 to the event manager 208. The event manager 208 then broadcasts the event to the software units of the gaming system 206. In particular, the event manager 208 will broadcast events to the tilt controller 206B.

Figure 3:
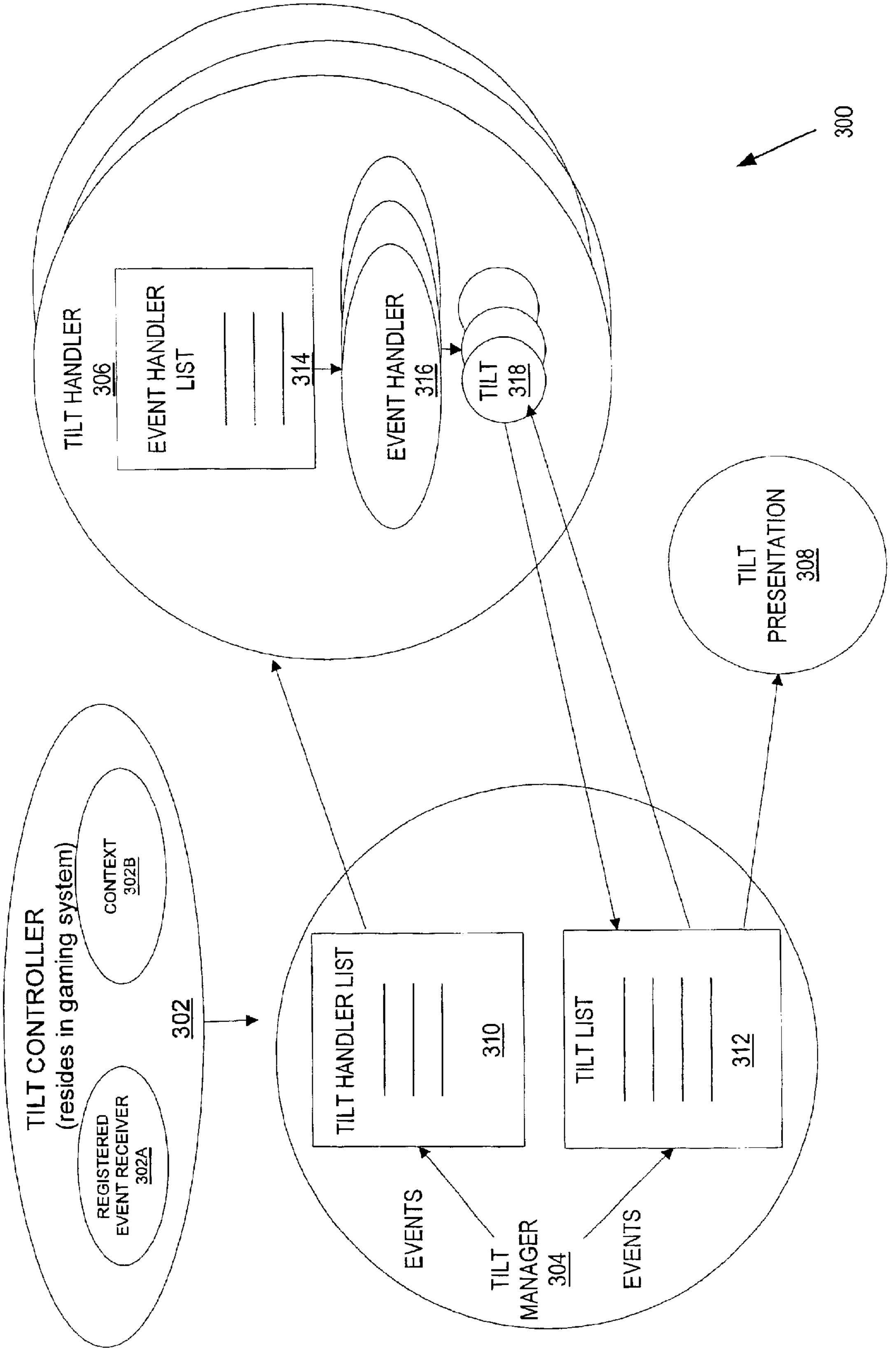
FIG. 3 is a block diagram of the components of a modular tilt handling system and associated components according to one embodiment of the present invention.

FIG. 3 is a block diagram of the components of a modular tilt handling system 300 and associated components according to one embodiment of the present invention. The modular tilt handling system 300 may be implemented on a master gaming controller with a processor utilizing an operating system that is used to run applications on a gaming machine or on a plurality of gaming machines. The master gaming controller executes various gaming software programs using one or more processors, such as a CPU. During execution, a software program may be temporarily loaded into a random-access-memory (RAM). Depending on the current operational state of the gaming machine, the number of types of software programs loaded in the RAM may vary with time. For instance, when a game is presented, particular software programs used to present a complex graphical presentation may be loaded into RAM. However, when the gaming machine is idle, these graphical software programs may not be loaded into the RAM.

Various gaming software programs, loaded into RAM for execution, may be managed as "processes" by an operating system used on the gaming machine. The operating system may also perform process scheduling and memory management. Examples of operating systems that may be used with the present invention are: the QNX operating system provided by QNX Software Systems, Ltd. (Kanata, Ontario, Canada); Windows, NT, NT embedded, and WinCE provided by Microsoft (Redmond, Wash.); Solaris provided by Sun Microsystems (Palo Alto, Calif.); or open sources such as LINUX, BSD and other variants of UNIX.

The operating system and gaming applications may be incorporated into the gaming machine as firmware, stored in a memory on the gaming machine, such as a read-only-memory (ROM) and/or RAM, or may be implemented as a combination of firmware in the processor and stored in the memory. Further, the operating system and/or gaming applications may be stored elsewhere and distributed to the gaming machine, for example, via a network from a game server or other network distribution device. Additionally, components of the present invention described herein as dynamically loaded code, may be dependent upon the operating system. Thus, for example, dynamic link libraries (DLLs) may be used in Windows-based implementations and shared objects in UNIX-based implementations.

The modular tilt handling system 300 treats events and tilts separately so tilts can be configured separately for different gaming jurisdictions. In this way, specific device drivers in the gaming machine do not need to know the gaming jurisdiction for which a machine is configured, what constitutes a tilt, or how it is displayed, cleared, etc.

As a general overview, the system 300 includes a tilt controller 302 that resides in the gaming system, a tilt manager 304 that receives events from the tilt controller 302, tilt handlers 306 that are shared objects loaded by the tilt manager 304, and tilt presentation 308 which is also a shared object loaded by the tilt manager 304.

The tilt controller 302 resides in the gaming system and includes a registered event receiver 302A and a context 302B, e.g., a tilt context. The registered event receiver 302A receives events and communicates them to the tilt manager 304, for example, through interprocess communication (IPC) requests. The tilt manager 304 uses the events to create and clear tilts in the gaming machine. When a hard tilt occurs on the gaming machine, typically the machine is in a lockout state that prohibits the player from continuing until the source of the tilt is cleared. During this time, the tilt is displayed on the gaming machine's monitor. Some tilts require the operator to turn the reset key, open and close the door, or press a series of buttons to clear the tilts.

At this time, the tilt manager 304 needs to have the input to determine the sequence of events that occurred while clearing the tilt. Thus, the second piece of functionality contained by the tilt controller 302 is a context 302B. The context 302B maintains logic to determine whether it can be exited or entered and when. The context 302B is notified when it is entered and exited by the context manager, allowing it to show and hide its displays. This allows the context manager to query the context 302B, based on posted events, to determine which context should be active. When the context 302B changes its state, it must update its internal logic to report whether it can be entered and exited. It must also post an information event to notify the context manager to assign a new active context. This allows the tilt manager 304 to receive input events and determine if any or all of the pending tilts have been cleared by a specific sequence of events, e.g., whether the context 302B is active. The tilt manager 304 receives event communications from the tilt controller 302 and controls how tilts are declared, displayed and cleared in the gaming machine.

Events can be generated from a wide variety of event conditions associated with a gaming machine and may be categorized, in some instances, as a particular type of event, such as invalid action event, patron attract event, bank event, bet event, bonus event, cash device event, configuration event, context event, critical input/output event, error event, game event, machine event, main menu event, menu event, progressive play event, security event, system event; or tilt event, e.g., a tilt, as discussed herein in accordance with the present invention. As earlier discussed, events which result in the declaration and generation of a tilt can vary widely dependent upon the gaming jurisdiction in which the gaming machine is located. By way of illustration only, examples of events which may result in the generation of a tilt in some gaming jurisdictions may include, but are not limited to, main door open, bill vault error, front panel door error, bill vault error cleared, front panel door error cleared, hand-pay cash-out request, printer error, device offline, out of service request, logic error, power failure, etc.

When the tilt manager 304 receives an event, it is responsible for acting on the event according to the gaming jurisdiction for which the gaming machine is configured. Based on the gaming jurisdiction's requirements, the event may result in no action taken by the tilt manager 304 or may result in the event being translated into a tilt. The tilt manager 304 also communicates the tilt condition to other processes in the gaming system. In one embodiment, this is done by posting tilts, e.g., tilt events, that indicate the tilt type to the event manager.

The tilt manager 304 manages and maintains a tilt handler list 310 and a tilt list 312. The tilt handler list 310 identifies all tilt handlers 306 associated with the tilt manager 304. The tilt list 312 is a listing of tilts declared by the system 300. The tilt handlers 306 are dynamically loaded code, such as shared objects, that may be loaded by the tilt manager 304 or that may be loaded from a shared object. The tilt manager 304 also loads the tilt presentation 308, which is also dynamically loaded code, such as a shared object, that includes tilt display data that effects display of tilt information on the gaming machine monitor.

The tilt manager 304 also tracks the open/closed status of all doors on the machine and compares them to configuration items which determine what door open statuses should cause the context to activate. For example, the configuration items may be: tilt on main door tilt type; tilt on drop door; tilt on bill acceptor door; tilt on processor board door; tilt on belly door; tilt on voucher dispenser door; and, tilt on card cage. Each item may be set to true or false. If the configuration item for a door is set to false, opening the door has no effect. If the configuration item for a door is set to true, opening the door causes the context to activate, putting the machine in a lockout state that prevents the player from continuing until the door is closed.

When the context 302B is active, the tilt manager 304 determines, by tilt priority, which tilt(s) are displayed. The tilt manager 304 receives display data, such as tilt text and background, from the tilt(s) to display and updates the tilt presentation. Since some tilts put the machine in a lockout state and often require operator interaction to clear, e.g., hard tilts, hard tilts have a higher priority than soft tilts, e.g., those that don't put the machine in a lock-out state. When there are more tilts than can be displayed on the screen, the tilt manager 304 selects for display the tilts with the highest priority. When a tilt is cleared or added, the tilt manager 304 re-evaluates the tilt priorities and updates the tilt presentation 308.

On initialization of the gaming machine and the related software units, including the system 300, the tilt manager 304 will locate and load all the tilt handlers 306 in the system and track them with the tilt handler list 310. When the tilt manager 304 receives an event, it passes it to every tilt handler 306 until one of the tilt handlers 306 creates a tilt 318 and returns a tilt interface to the tilt manager 304. When a tilt handler 306 returns a tilt interface, the tilt manager adds it to the tilt list 312. By modularly determining tilts using the tilt handlers 306, jurisdiction specific tilt handlers 306 can be easily implemented in the gaming software independent of the event and of the main gaming controlling software.

Tilt handlers 306 are dynamically loaded code, such as shared objects, that contain the functionality for creating and clearing a specific set of tilts. In one example, the tilt handler 306, for example, TiltHandler.so, contains a tilt handler interface that has the following functions:

| Functions | Description |
|---|---|
| ProcessEvent | Receive an event from the tilt manager. If a tilt needs to be created due to the event, create a tilt and return a tilt interface to it. |
| RecreateATilt | If the system just recovered from a power failure, necessary tilts that existed before the power failure must be recreated. This method returns only one tilt interface at a time, causing the tilt manager to continue calling tilt interface until no interfaces are returned. |

Each tilt handler 306 maintains an event handler list 314 of event handlers 316. The event handler list 314 identifies event handlers 316 that are accessible by the tilt handler 306. Each event handler 316 is responsible for responding to one specific event.

In one example, the event handler may contain the following functions:

| Functions | Description |
|---|---|
| ProcessEvent | Receive an event from the tilt handler. If a tilt needs to be created due to the event, create a tilt and return a tilt interface to that tilt. |
| RecreateATilt | If the system just recovered from a power failure, recreate the necessary tilts that existed before the power failure. This method returns only one tilt interface at a time. |

When a tilt handler 306 receives an event, it passes it to each event handler 316 in turn, until one of them returns a tilt interface. Each event handler 316 is responsible for responding to one specific event. When it receives an event, the event handler 316 determines whether or not to create a tilt. If it does create a tilt 318, it returns a tilt interface, which the tilt handler 306 then returns to the tilt manager 304 for addition to the tilt list 312. In this way, an event is now translated into a tilt event.

In one example, an event handler 316 consists of four classes: EventHandler, TiltDisplay, TiltClear, and Tilt:

| Class | Description |
|---|---|
| EventHandler | When the event handler receives an event that it handles, it creates a tilt and returns it to the tilt handler. The event handler can use configuration items to implement different jurisdictional behaviors and to set tilt priorities. |
| TiltDisplay | TiltDisplay is a class that contains all display data for a tilt, such as text instructions for clearing the tilt. The Tilt class contains an instance of the TiltDisplay class and allows access to the display through functions such as SetTiltDisplayTitle and getTiltDisplayText. |
| TiltClear | TiltClear is a class that implements the state machine necessary to track the clearing of the tilt. The Tilt class contains an instance of the TiltClear class and passes all events to it. TiltClear is responsible for clearing the tilt when it receives the proper input. |
| Tilt | The Tilt is responsible for receiving and processing events which may affect the state of the tilt. The following functions are specific to an Event Handlers' Tilt class: |

| Functions | Description |
|---|---|
| GetTiltPresentationso | Return the string name of the .so to use to display the tilt. Used by tilt manager to load the correct .so. |
| GetTiltPresentationScript | Return the string name of the script to use to display the tilt. Used by the TiltPresentation.so to create the tilt display controls. |
| AllowCashout | Return true if the player is allowed to cashout while the machine is in this tilt state. Return false otherwise. Used by tilt presentation to enable/disable the cashout button. |
| GetClearDisplayText | Return the text to use when displaying the tilt to the operator or attendant. Used by tilt manager to update the tilt presentation when the main door is open. |
| GetClearDisplayTitle | Return the tilt to use when displaying the tilt to the operator or attendant. Used by tilt manager to update the tilt presentation when the main door is open. |
| GetTiltDisplayText | Return the text to use when displaying the tilt to the player. Used by tilt manager to update the tilt presentation when the main door is closed. |

-continued

| | |
|---|---|
| GetTiltDisplayTitle | Return the title to use when displaying the tilt to the player. Used by tilt manager to update the tilt presentation when the main door is closed. |
| GetTimingRequirement | Set the amount of time that the tilt needs to wait, before performing some check, state change or status change (e.g.: the tilt may be pending until five seconds after an error, or may clear after sixty seconds). The return value is the number of milliseconds the tilt needs to wait. The tilt manager reads this value and calls trigger timer at the appropriate time. |
| GetPriority | Return the priority of the tilt. Used by tilt manager to determine which tilt(s) to display. |
| IsActive | Return true if a tilt is displayed. Return false otherwise. Used by the tilt to tell when to update a display and when to inform tilt manager that it has changed. |
| GetTiltStatus | Returns the status of the tilt: TILT__STATUS__PENDING-the tilt interface does not yet represent an actual tilt. This is used for tilts that require multiple events or time to pass before becoming actual tilts. TILT__STATUS__TILT - the tilt interface represents an actual tilt. TILT__STATUS__CLEAR - the tilt has been cleared. |
| IsHardTilt | Return true if the tilt is a hard tilt. Return false otherwise. Used by tilt manager to tell whether to put the machine in a lockout state. |
| ProcessEvent | Process an event and update the state of the tilt. Used by tilt manager to pass events to the existing tilts. |
| TriggerTimer | Inform the tilt that its timing requirement may be fulfilled. The tilt will change its timer requirement if it still needs to wait. |
| SetClearDisplayText/ SetClearDisplayTitle | These two methods may be used to set data items within the TiltClear class. |
| SetErrorData | Used to record the event code and error code for the event leading to the creation of a tilt. |
| SetIsActive | Sets the status that tells a tilt whether or not it is being displayed on the screen. May be called by TiltContext only. |
| SetTiltStatus | Used by the event handler to create a tilt. Used by the tilt object to clear itself. Sets the tilt status to pending, tilt, or clear. The default is clear. |
| SetIsHardTilt | Sets a Boolean to indicate if the tilt is a hard or soft tilt. |
| SetPriority | Used to set the priority of the tilt. |
| SetTiltClear | Sets the TiltClear class used to control the clearing of the tilt and display messages to the attendant or operator when the main door is opened. |
| SetTiltDisplay | Sets the TiltDisplay class used to display the tilt when the main door is not opened. |
| SetTiltDisplayText/ SetTiltDisplayTitle | These two methods may be used to set data items within the TiltDisplay class. |
| SetTimingRequirement | Set the amount of time that the tilt needs to wait before performing some check, state change or status change. Used by the TiltClear |

-continued

| | |
|---|---|
| | class to put a time limit on its tilt states. |
| ClearTimingRequirement | Clear the required wait without fulfilling it. Used by the TiltClear class if other input makes the wait unnecessary. |

As illustrated in the example above, the logic in the tilt object determines if a tilt exists. As shown above, the tilt object is highly configurable, thus providing a large amount of flexibility in the declaration of the tilt and in the clearing of the tilt. It will be appreciated that the configurable functions of the tilt object shown above, for example, status, display, priority of tilt, type of tilt, wait time to clear, etc., are only some examples of what may be included in the tilt object and that other functions may also be included, and, thus, the above example is not meant to be limiting upon the configuration of the tilt object.

The tilt manager 304 maintains the tilt list 312 to track all tilts that have not been cleared. The tilt manager 304 passes every event received from the tilt controller 302 to every tilt 318, e.g., tilt interface, in the tilt list 312, giving each tilt 318 an opportunity to update its state, update its display, or to clear itself.

When a tilt is cleared, the tilt manager 304 removes it from the tilt list 312. When hard tilts exist in the tilt list 312, the tilt manager 304 posts an EnterTiltContext event. The context 302B in the tilt controller 302 receives this event and activates the tilt context. When no hard tilts exist and no doors that require the tilt context to be active are open, the tilt manager 304 posts an ExitTiltContext event. The context 302B of the tilt controller 302 receives the event and deactivates the tilt context. The tilt manager 304 then updates the tilt presentation 308 when the tilt display data changes.

Tilt presentation 308 is dynamically loaded code, such as a shared object, loaded by the tilt manager 304 and is responsible for the display of tilt information on the gaming machine while the tilt context is active. The tilt presentation 308 may be written using any of a variety of program syntaxes that can render to a graphics card. In one embodiment, TheatreOpenGL may be used as well as other implementations using OpenGL (version 1.2). TheatreOpenGL is a proprietary IGT standard, while OpenGL (version 1.2) is an open standard.

When the tilt manager 304 enters the tilt context, tilt presentation 308 executes a script, for example, TiltPresentationsetup.script, used to configure the tilt presentation 308 to be displayed by the gaming system.

The following is one example of a script structure:

```
TiltPresentationSetup
{
    PresentationFunction (arguments);
    . . .
    PresentationObject ( )
    {
        presentationObjectionFunction (arguments);
        . . .
    }
    . . .
}
```

In one embodiment, there is a default tilt presentation and each game and language can have its own unique tilt presentation, e.g., TiltPresentation.so. When the display is updated, the tilt manager 304 queries the tilts, e.g., tilt objects, to determine which tilt presentation 308 to load and use. Tilt presentation 308 is responsible for the tilt display when the tilt context is active. Tilt presentation 308 supports various scripted presentation functions, objects and object functions that control the display of information on the gaming machine.

In one example, the tilt presentation 308 has the following functions:

| Functions | Description |
|---|---|
| SetScript | Set the name of the tilt presentation script to be used to create the tilt display controls. |
| SetDefaults | Set the TiltPresentation to its default settings. There is a default tilt, text and background. |
| SetText | Set the text description of the tilts(s) being displayed. This may include operator instructions for clearing the tilt. |
| SetTilt | Set the tilt of the tilt(s) being displayed. |
| SetMeters | Update the TiltPresentation with the latest game meters, including current credits in the machine, last bet amount and last money won amount. Many jurisdictions require these values to be displayed at all times, so TiltPresentation must display them when the Tilt Context is active. |

In some embodiments, the gaming machine may include a rendering system that permits presentation of different context displays simultaneously. An example of such a rendering system is described in co-pending U.S. patent application Ser. No. 09/927,901, filed Aug. 9, 2001, which is herein incorporated by reference. In systems of this type, the tilt presentation is further capable of displaying over the active game screen. This enables a viewer to see the animations and paylines through the tilt presentation display. In some embodiments, contexts with higher priority may be drawn over contexts with lower priority. Thus, the tilt context may be assigned a higher priority than a game display, such that the tilt context display is drawn on top of and "blended" with the game context. In some embodiments, this may occur without "knowledge" by the particular game software of the tilt display.

Figure 4:
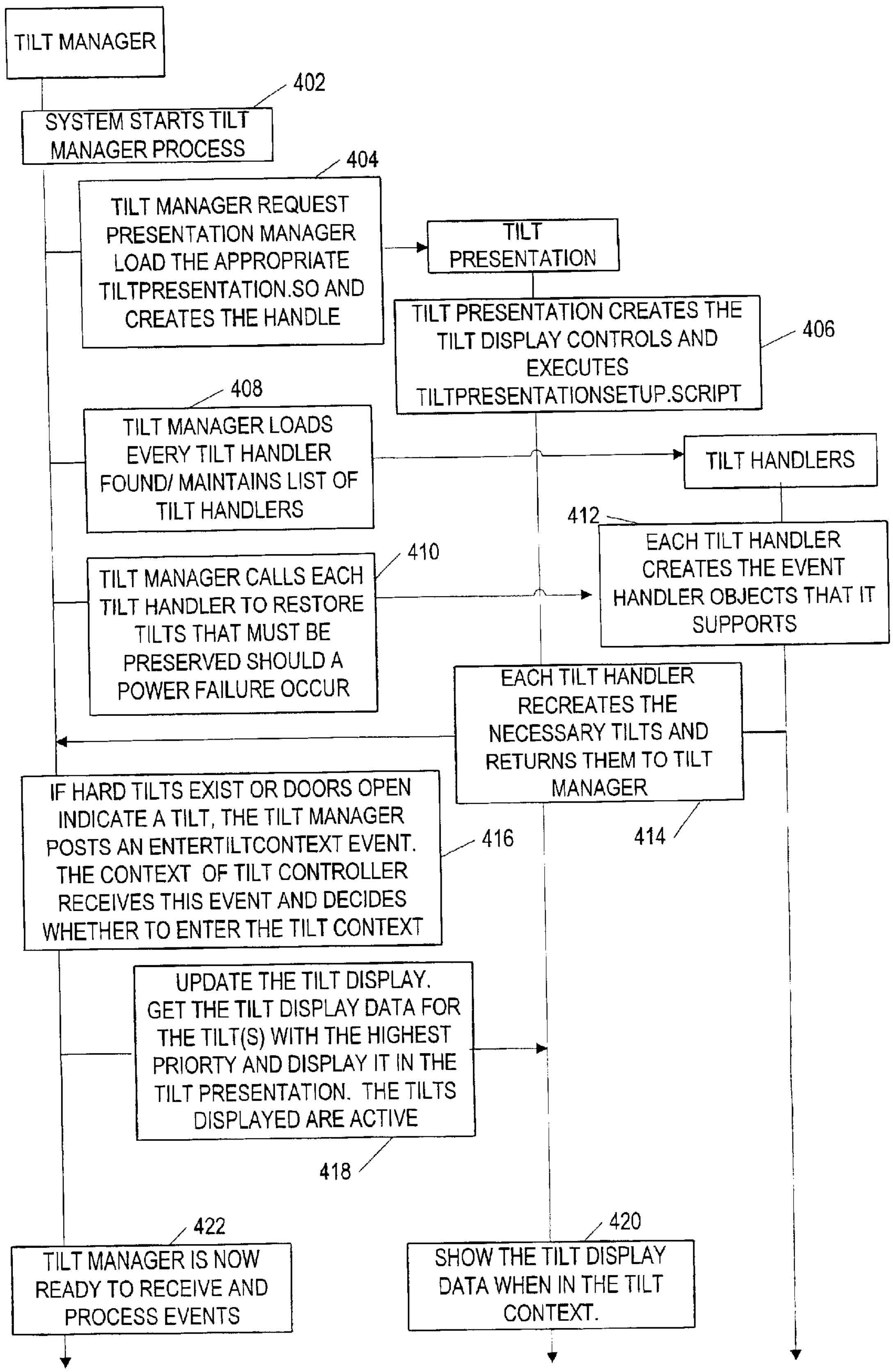
FIG. 4 is a flow diagram illustrating initialization of the modular tilt handling system according to one embodiment of the present invention.

FIG. 4 is a flow diagram illustrating initialization of the modular tilt handling system according to one embodiment of the present invention. Prior to initialization of the tilt manager 304 and its associated elements, the gaming machine is typically initialized. This is typically done by providing initial power to the gaming machine. The gaming machine then loads configuration files, then critical devices, device drivers, resource managers, device interfaces, software applications and then launches the communication protocols. During the loading of software applications, the gaming machine software and its associated applications, including the modular tilt handling system of the present invention, may be loaded. It will be appreciated that the above-described initialization process may be implemented differently.

At process 402, the gaming system starts the modular tilt handling system by initializing the tilt manager 304. At process 404, the tilt manager 304 sends a request to the presentation manager of the gaming system to load the appropriate tilt presentation 308, for example, a default presentation, and creates a handle, e.g., an interface to the tilt presentation 308. At process 406, the tilt presentation 308 creates the tilt display controls and executes the set up script, which, at process 420, will display tilt display data on the gaming machine if the system is in an active tilt context.

At process 408, the tilt manager 304 also loads each tilt handler 306 found and maintains the tilt handler list 310. Alternatively, dynamically loaded code, such as a shared object, may load each tilt handler 306. At process 410, the tilt manager 304 then calls each tilt handler 306 to restore tilts that are to be preserved should a power failure occur. At process 412, each tilt handler 306 creates the event handler objects that it supports, and each tilt handler 306 recreates the necessary tilts and returns them to the tilt manager 304 at process 414.

If hard tilts exist or doors open indicate a tilt, at process 416, the tilt manager 304 posts an enter tilt context event. The context 302B receives this event and decides whether to enter the tilt context. At process 418, the tilt manager 304 gets the tilt display data for the tilts with the highest priority and updates the tilt display, and, if there are active tilts, displays the data in the tilt presentation 308 at process 420. At process 422, the tilt manager 304 and its associated elements are ready to receive and process events.

A description of one example of event processing and event processing by the modular tilt handling system will now be described according to one embodiment of the present invention.

Figure 5:
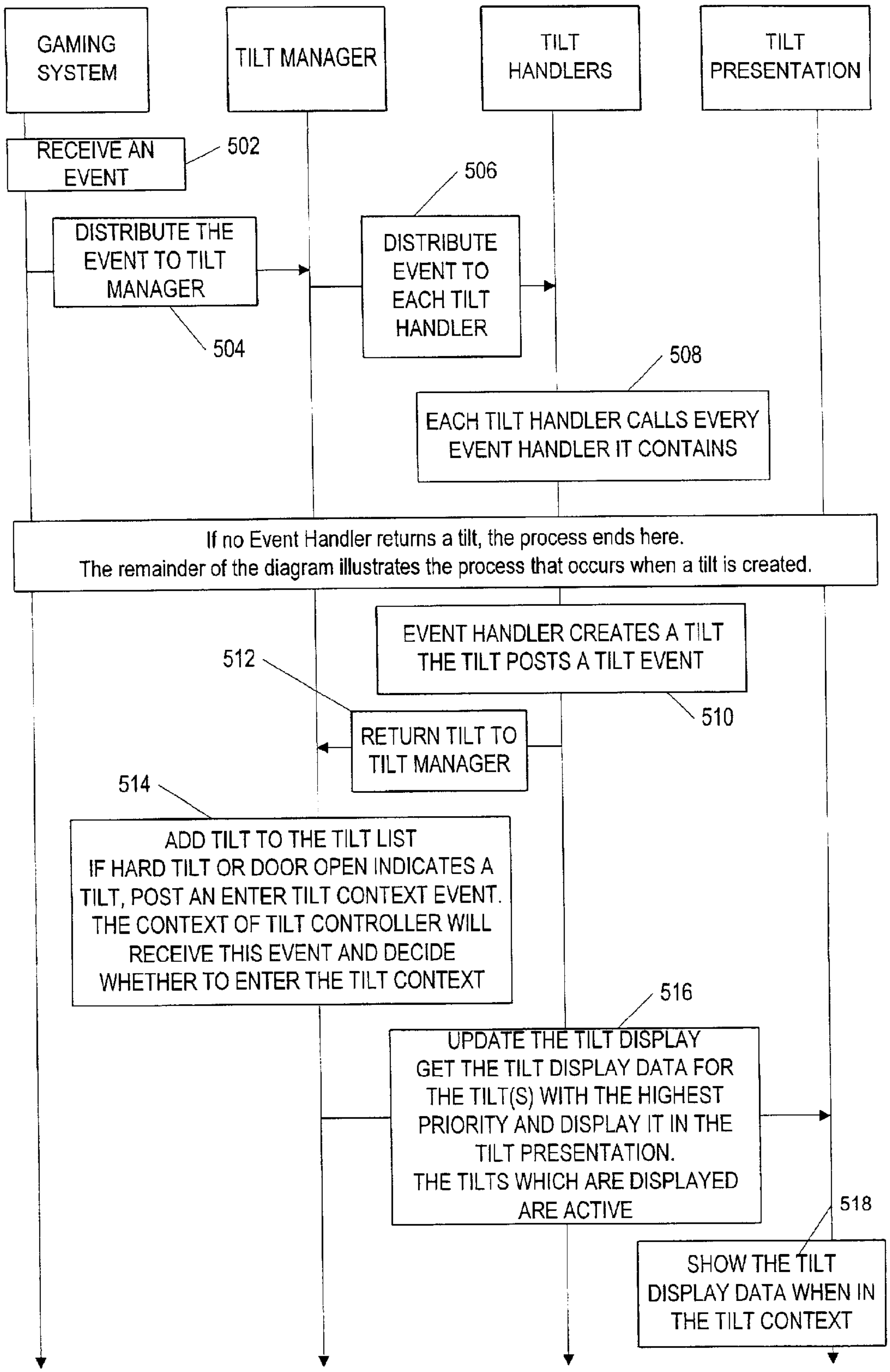
FIG. 5 is a flow diagram illustrating interaction of the components of the modular tilt handling system during the processing of an event and the generation of a tilt according to one embodiment of the present invention; and, FIG. 6 is a flow diagram illustrating interaction of the components of the modular tilt handling system during the processing of an event and clearing of a tilt according to one embodiment of the present invention.

FIG. 5 is a flow diagram illustrating interaction of the components of the modular tilt handling system during the processing of an event and the generation of a tilt according to one embodiment of the present invention.

As earlier discussed, when an event occurs in the gaming machine, the event is posted to the event manager which then distributes the event to the various applications of the gaming machine software, which includes the gaming system software and its related applications. In particular, at process 502, the tilt controller 302 of the gaming system receives the event, and at process 504, passes the event on to the tilt manager 304. At process 506, the tilt manager passes the event to each tilt handler 306 on the tilt handler list 310 until one of them creates a tilt 318 and returns a tilt interface. When a tilt handler 306 returns a tilt interface, the tilt manager 304 adds the tilt 318 to the tilt list 312.

In one embodiment, the tilt manager 304 may sequentially pass the event to each tilt handler 306 on the tilt handler list 310 until a tilt interface is returned. It will be appreciated, however, that in other embodiments, the tilt manager 304 may pass the event to all or some of the tilt handlers 306.

At process 508, when a tilt handler 306 receives an event, it calls every event handler 316 it contains, in turn, until one of them creates a tilt 318. If no tilt is created and no event handler 316 returns a tilt, the process ends at this point.

If, however, the event hander 316 creates a tilt 318, at process 510, the tilt 318 posts a tilt event with the tilt handler 306. At process 512, the tilt handler 306 returns a tilt interface to the tilt manager 304.

At process 514, the tilt manager 304 adds the tilt 318 to the tilt list 312. If hard tilts exist, or door open indicates a tilt, the tilt manager 304 posts an enter tilt context event. The context 302B receives this event and determines whether to enter the tilt context.

At process 516, the tilt manager 304 gets the tilt display data for the tilt(s) with the highest priority and updates the tilt presentation 308 that updates the display. The tilts that are displayed are active.

At process 518, the tilt display data is displayed on the gaming machine when the gaming system is in the tilt context.

Figure 6:
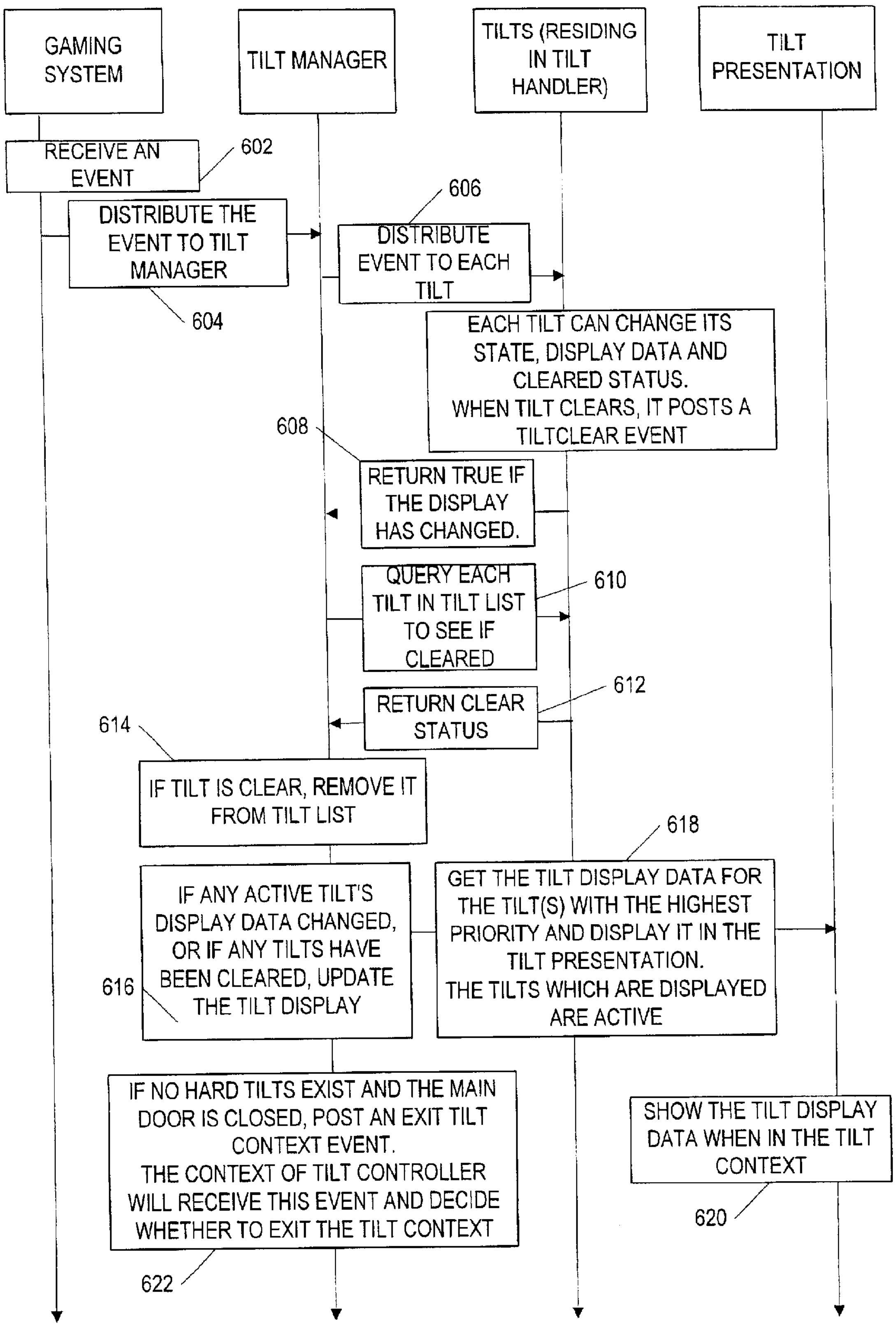

FIG. 6 is a flow diagram illustrating interaction of the components of the modular tilt handling system during the processing of an event and clearing of a tilt according to one embodiment of the present invention. In this example, at process 602, the event manager has distributed an event to the gaming system that is received by the tilt controller 302.

At process 604, the tilt controller 302 distributes the event to the tilt manager 304. At process 606, the tilt manager 304 distributes the event to each tilt 318 in the tilt list 312. Each tilt can change its state, display data and cleared status based on the event it has received. For example, if the display data has changed, at process 608, the tilt 318 returns a "true" to the tilt manager 304. At process 610, the tilt manager 304 queries each tilt 318 in the tilt list 312 to determine if it has been cleared. At process 612, once a tilt clears, the tilt 318 posts a tilt clear event and returns the clear status to the tilt manager 304. At process 614, the tilt manager 304 removes a cleared tilt 318 from the tilt list 312.

At process 616, the tilt manager 304 updates the tilt display if any active tilt 318 display data has changed, or if any tilt 318 has been cleared. At process 618, the tilt manager 304 obtains the tilt display data for the tilts 318 with the highest priority and displays it in the tilt presentation. At process 620, the tilt display data is displayed on the gaming machine when the system is in the tilt context.

At process 622, if no hard tilts exist and the main door is closed, the tilt manager 304 posts an exit tilt context event. The context 302B receives this event and determines whether to exit the tilt context.

Thus, the present invention provides a method for generating tilts on a gaming machine according to the requirements of a gaming jurisdiction in which the gaming machine is operating. In some embodiments, one or more game software elements, e.g., of the modular tilt handling system, are loaded into RAM to respond to an event according to the requirements of a gaming jurisdiction in which the gaming machine is operating. When an event is received from, for example, a gaming device, a sensor connected to sensor monitoring circuitry, or a game software element, one or more of the game software elements are executed in RAM, and a tilt may be declared. For example, a tilt handler receives an event, passes it to an event handler which creates a tilt object representing a specific tilt.

In some embodiments, the declaration of a tilt may result in locking-out the gaming machine to game play, for example, in the case of a hard tilt.

In some embodiments, the present invention also provides for determining the tilt conditions to display on the gaming machine, for example, by querying tilt objects, prioritization of the pending tilts on the tilt list, and through the update of tilt presentation.

In some embodiments, the present invention further provides for clearing a tilt, for example, by communication of events to the tilt objects that may update or clear the tilt.

The present invention, as described herein, illustrates how separation of the event and the tilt provides a modular system for handling tilts in a gaming system that is both flexible and dynamically configurable to address the particular requirements of a gaming jurisdiction in which the gaming machine is located.

Further, because the tilt manager logs all tilt events, the event log sees the logged event, the tilts generated by the events, and the associated tilt created and tilt cleared events. This allows an operator to view a menu page on a display that filters the event log and displays the tilts to the operator. The menu page may also be used to create a file for the event log, or other desired file or report. The menu page may be displayed on a gaming machine monitor, or other display, such as a hand held display on a PDA.

It will be appreciated that implementation of the modular elements on a gaming machine can be accomplished in a wide variety of ways. In one example, a general suite of tilt handlers may be installed with the present system into a gaming machine during assembly and programming. Then, when a gaming machine is to be shipped to a particular gaming jurisdiction, only the tilt handler files associated with the destination gaming jurisdiction may be easily selected.

As another example, the gaming machine may be shipped and then the associated tilt handlers may be loaded after the gaming machine reaches the destination. This loading may be accomplished in a variety of ways, for example, but not limited to, by an operator, or from a network, PDA or other distributive mechanism.

By selectively loading the needed tilt handler files and the accompanying event handlers, the gaming machine can be easily and flexibly configured. Further, additions, deletions, and upgrades to tilt handlers available to the tilt manager can be easily accomplished by the addition, deletion, or augmentation of a tilt handler file including each event handler.

Although the foregoing invention has been described in some detail for purposes of clarity of understanding, it will be apparent that certain changes and modifications may be practiced within the scope of the appended claims. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached. Further, the gaming machine may be designed as a stand alone gaming device or networked with other gaming devices, including other servers or gaming devices over the Internet or through other wired and wireless systems.

What is claimed is:

1. A gaming machine comprising:

a master gaming controller configured to generate one or more games played on the gaming machine by executing a plurality of gaming software elements;

a plurality of gaming devices connected to the gaming machine and in communication with the master gaming controller;

a memory configured to store the plurality of gaming software elements;

a gaming operating system comprising logic to load and unload the gaming software elements into a RAM from the memory for execution; and a modular tilt handling system that is loaded from the memory to the RAM by the operating system; said modular tilt system comprising;

first gaming software elements for receiving an event and determining when the event is a tilt and second gaming software elements for responding to the tilt wherein the first gaming software elements are decoupled from the second gaming software elements in a manner that allows the gaming machine to load from the memory second gaming software elements that are in compliance with the regulations of a gaming jurisdiction in which the gaming machine is operating without altering the first gaming software elements.

2. The gaming machine of claim 1, further comprising sensor monitoring circuitry connected to the gaming machine and in communication with the master gaming controller wherein the sensor monitoring circuitry generates the event in response to one or more event conditions detected by the sensor monitoring circuitry.

3. The gaming machine of claim 1, wherein the modular tilt handling system further comprises:

a tilt controller, the tilt controller for communicating events generated in the gaming machine to a tilt manager;

a tilt manager in communication with the tilt controller, the tilt manager responsible for declaring, displaying and clearing tilts resulting from the events;

at least one tilt handler loaded by and in communication with the tilt manager, the tilt handler configured to generate one or more tilt objects in response to an event; and a tilt presentation loaded by and in communication with the tilt manager, wherein the tilt presentation is configured to present tilt related data for display on the gaming machine.

4. The gaming machine of claim 3, wherein the tilt controller is located in the gaming system.

5. The gaming machine of claim 3, wherein the tilt controller further comprises a registered event receiver designed to receive events and communicate the events to the tilt manager.

6. The gaming machine of claim 5, wherein the tilt controller further comprises a context designed to receive input events and determine if the tilt context is active.

7. The gaming machine of claim 3, wherein the tilt manager further comprises a tilt handler list and wherein the tilt handler list comprises a list of tilt handlers loaded by the tilt manager.

8. The gaming machine of claim 7, wherein the tilt manager further comprises a tilt list wherein the tilt list comprises a list of tilts generated by the tilt handler that have not cleared.

9. The gaming machine of claim 8, wherein the tilts on the tilt list are prioritized.

10. The gaming machine of claim 8, wherein each of the tilts listed on the tilt list comprises a tilt interface to the tilt object in the tilt handler.

11. The gaming machine of claim 3, wherein the tilt handler is dynamically loaded code.

12. The gaming machine of claim 11, wherein the tilt handler is a shared object.

13. The gaming machine of claim 3, wherein the tilt handler further comprises at least one event handler.

14. The gaming machine of claim 13, wherein the tilt handler further comprises an event handler list of event handlers associated with the tilt handler.

15. The gaming machine of claim 14, wherein the tilt handler further comprises a tilt object generated by an event handler.

16. The gaming machine of claim 15, wherein the tilt object is configured to return to the tilt manager information associated with a single tilt.

17. The gaming machine of claim 15, wherein the tilt object is configured to return to the tilt manager at least one of display data for use when displaying the tilt on the gaming machine, timing data associated with waiting to declare and clear the tilt, the priority of the tilt, the status of the tilt, the type of tilt, whether the tilt is active and combinations thereof.

18. The gaming machine of claim 3, wherein the tilt presentation is dynamically loaded code.

19. The gaming machine of claim 18, wherein the tilt presentation is a shared object.

20. The gaming machine of claim 1, wherein the one or more games is selected from the group consisting of games of chance and games of skill.

21. The gaming machine of claim 1, wherein the one or more games is selected from the group consisting of video slot games, mechanical slot games, video black jack games, video poker games, video keno games, video bingo games, video pachinko games, video card games, video games of chance, video games of skill, and combinations thereof.

22. The gaming machine of claim 1, wherein the gaming device is selected from the group consisting of a bill acceptor, a coin hopper, a printer, a card reader, a display, a coin acceptor, a meter, a player tracking top box, a light bezel, a button panel, a communication device, a power supply monitor, security detection circuitry, a camera, an amplifier, a cash-in device, a cash-out device, an information input device, and a master game controller.

23. The gaming machine of claim 3, wherein the tilt presentation is capable of displaying over an active game screen of the gaming machine such that the active game screen can be viewed through the tilt presentation display.

24. A method of generating tilts on a gaming machine, the method comprising:

loading into a RAM first gaming software elements for receiving an event and determining when the event is a tilt and loading into the RAM second gaming software elements for responding to the tilt wherein the first gaming software elements are decoupled from the second gaming software elements in a manner that allows the gaming machine to load the second gaming software elements that are in compliance with the regulations of a gaming jurisdiction in which the gaming machine is operating without altering the first gaming software elements;

loading into the RAM third gaming software elements for generating a game of chance played on the gaming machine;

receiving the event from at least one of a gaming device, a sensor connected to sensor monitoring circuitry and a game software element;

executing the gaming software elements in the RAM; and declaring the tilt.

25. The method of claim 24, further comprising:

clearing the tilt.

26. The method of claim 24, further comprising:

determining the tilt conditions associated with the tilt to a display on the gaming machine.

27. The method of claim 24, further comprising:

prior to declaring the tilt, comparing the event to one or more tilt conditions.

28. The method of claim 24, further comprising:

locking-out the gaming machine to game play.

29. A method for declaring a tilt resulting from an event in a gaming machine, the method comprising:

receiving an event at a tilt controller;

communicating the event from the tilt controller to a tilt manager, the tilt manager further comprising a tilt handler list and a tilt list, the tilt handler list comprising a list of tilt handlers associated with the tilt manager, the tilt list comprising a list of tilts that have not been cleared in the gaming machine;

communicating the event from the tilt manager to at least one tilt handler on the tilt handler list;

communicating the event from the tilt handler to at least one event handler;

creating a tilt object by the event handler in response to the event wherein the event handler is decoupled from the tilt controller and the tilt manager in a manner that allows the gaming machine to load the event handler that is in compliance with the regulations of a gaming jurisdiction in which the gaming machine is operating without altering the tilt manager and the tilt controller;

communicating a tilt interface from the tilt handler to the tilt manager, the tilt interface providing a handle back to the tilt object;

identifying the tilt object on the tilt list; and updating a tilt presentation loaded by the tilt manager to include display of information associated with the tilt.

30. The method of claim 29, wherein the event is communicated sequentially from the tilt manager to each tilt handler on the tilt handler list until a tilt interface is returned.

31. The method of claim 29, wherein the event is communicated sequentially from the tilt handler to each event handler on the event handler list until a tilt interface is returned.

32. The method of claim 29, further comprising prioritizing the listing of the tilt object on the tilt list according to a prioritization scheme.

33. The method of claim 29, wherein the event is generated by at least one of a gaming device, sensor monitoring circuitry and a game software element.

34. A method for clearing a tilt declared on a gaming machine, the method comprising:

receiving an event at a tilt controller;

communicating the event from the tilt controller to a tilt manager, the tilt manager further comprising a tilt handler list and a tilt list, the tilt handler list comprising a list of tilt handlers associated with the tilt manager, the tilt list comprising a list of tilts that identifies tilt objects that have not been cleared in the gaming machine;

communicating the event from the tilt manager to each of the tilt objects identified on the tilt list;

updating the state of each tilt object based upon the event and in accordance with the regulations of a gaming jurisdiction;

querying the tilt object by the tilt manager to determine if the tilt object is cleared;

communicating that the tilt object is cleared in response to a query from the tilt manager;

removing the cleared tilt object from the tilt list; and updating a tilt presentation loaded by the tilt manager to include updated display of information associated with any remaining tilts.

35. The method of claim 34, wherein the event is communicated to each tilt object identified on the tilt list.

36. The method of claim 34, wherein the tilt list is reprioritized prior to updating the tilt presentation so that data associated with the highest priority tilts is displayed.

37. The method of claim 34, wherein prior to returning a cleared status, the tilt objects are queried after receipt of each received event, and the tilt presentation display data is updated.

38. The method of claim 34, wherein the event is generated by at least one of a gaming device, sensor monitoring circuitry and a game software element.

39. A gaming machine network comprising:

a plurality of file storage devices storing gaming software programs;

a plurality of gaming machines, each gaming machine comprising:

a gaming system configured to control one or more games played on the gaming machine;

a plurality of gaming devices connected to the gaming machine and in communication with the gaming system wherein at least one of the gaming devices generates an event in response to one or more event conditions generated by the gaming device;

a memory configured to store a modular tilt handling system that is dynamically configurable, the modular tilt handling system comprising a plurality of gaming software elements that allow the master gaming controller to detect events and to generate one or more tilt conditions in response to the one or more events in accordance with the regulations of a gaming jurisdiction, wherein the modular tilt handling system further comprises:

a tilt controller, the tilt controller for communicating events generated in the gaming machine to a tilt manager;

a tilt manager in communication with the tilt controller, the tilt manager responsible for declaring, displaying and clearing tilts resulting from the events;

at least one tilt handler loaded by and in communication with the tilt manager, the tilt handler configured to generate one or more tilt objects in response to an event, wherein each tilt object represents a tilt; and a tilt presentation loaded by and in communication with the tilt manager, wherein the tilt presentation is configured to present tilt related data for display on the gaming machine; and a network allowing communication between the file storage devices and the plurality of gaming machines.

40. The gaming machine network of claim 39, further comprising:

sensor monitoring circuitry connected to the gaming machine and in communication with the gaming system wherein the sensor monitoring circuitry generates the event in response to one or more event conditions detected by the sensor monitoring circuitry.

41. The gaming machine network of claim 39, wherein the network is the Internet.

42. The gaming machine network of claim 39, wherein the network is an intranet.

43. The gaming machine network of claim 39, wherein the tilt controller is located in the gaming system.

44. The gaming machine network of claim 39, wherein the tilt controller further comprises a registered event receiver.

45. The gaming machine network of claim 44, wherein the tilt controller further comprises a context.

46. The gaming machine network of claim 39, wherein the tilt manager further comprises a tilt handler list wherein the tilt handler list comprises a list of tilt handlers associated with the tilt manager.

47. The gaming machine network of claim 46, wherein the tilt manager further comprises a tilt list wherein the tilt list comprises a list of tilts generated by the tilt handler that have not cleared.

48. The gaming machine network of claim 47, wherein the tilts on the tilt list are prioritized.

49. The gaming machine network of claim 48, wherein each of the tilts listed on the tilt list comprise a tilt interface to the tilt object in the tilt handler.

50. The gaming machine network of claim 39, wherein the tilt handler is dynamically loaded code.

51. The gaming machine network of claim 39, wherein the tilt handler is a shared object.

52. The gaming machine network of claim 39, wherein the tilt handler further comprises at least one event handler.

53. The gaming machine network of claim 52, wherein the tilt handler further comprises an event handler list of event handlers associated with the tilt handler.

54. The gaming machine network of claim 52, wherein the tilt handler further comprises a tilt object generated by an event handler.

55. The gaming machine network of claim 54, wherein the tilt object is configured to return to the tilt manager information associated with a single tilt.

56. The gaming machine network of claim 54, wherein the tilt object is configured to return to the tilt manager at least one of display data for use when displaying the tilt on the gaming machine, timing data associated with waiting to declare and clear the tilt, the priority of the tilt, the status of the tilt, the type of tilt, and whether the tilt is active.

57. The gaming machine network of claim 39, wherein the tilt presentation is dynamically loaded code.

58. The gaming machine network of claim 39, wherein the tilt presentation is a shared object.

59. The gaming machine network of claim 39, wherein the tilt presentation is capable of displaying over an active game screen of the gaming machine such that the active game screen can be viewed through the tilt presentation display.

60. A computer readable medium containing executable computer program instructions which when executed by a digital processing system cause the system to perform a method for declaring a tilt resulting from an event in a gaming machine, the method comprising:

receiving an event at a tilt controller;

communicating the event from the tilt controller to a tilt manager, the tilt manager further comprising a tilt handler list and a tilt list, the tilt handler list comprising a list of tilt handlers associated with the tilt manager, the tilt list comprising a list of tilts that have not been cleared in the gaming machine;

communicating the event from the tilt manager to at least one tilt handler on the tilt handler list;

communicating the event from the tilt handler to at least one event handler;

creating a tilt object by the event handler in response to the event wherein the event handler is decoupled from the tilt controller and the tilt manager in a manner that allows the gaming machine to load the event handler that is in compliance with the regulations of a gaming jurisdiction in which the gaming machine is operating without altering the tilt manager and the tilt controller;

communicating a tilt interface from the tilt handler to the tilt manager, the tilt interface providing a handle back to the tilt object;

identifying the tilt object on the tilt list; and updating a tilt presentation loaded by the tilt manager to include display of information associated with the tilt.

61. The computer readable medium of claim 60, wherein the event is communicated sequentially from the tilt manager to each tilt handler on the tilt handler list until a tilt interface is returned.

62. The computer readable medium of claim 60, wherein the event is communicated sequentially from the tilt handler to each event handler on the event handler list until a tilt interface is returned.

63. The computer readable medium of claim 60, further comprising prioritizing the tilt object on the tilt list according to a prioritization scheme.

64. A computer readable medium containing executable computer program instructions which when executed by a digital processing system cause the system to perform a method for generating tilts on a gaming machine, the method comprising:

loading into the RAM first gaming software elements for receiving an event and determining when the event is a tilt and loading into the RAM second gaming software elements for responding to the tilt wherein the first gaming software elements are decoupled from the second gaming software elements in a manner that allows the gaming machine to load the second gaming software elements that are in compliance with the regulations of a gaming jurisdiction in which the gaming machine is operating without altering the first gaming software elements;

loading into the RAM third gaming software elements for generating a game of chance played on the gaming machine;

receiving the event from at least one of a gaming device, a sensor connected to sensor monitoring circuitry and a gaming software element;

executing the gaming software elements in the RAM; and declaring the tilt.

65. The computer readable medium of claim 64, wherein the method further comprises:

clearing the tilt.

66. The computer readable medium of claim 64, wherein the method further comprises:

determining the tilt conditions to a display on the gaming machine.

67. The computer readable medium of claim 64, wherein the method further comprises:

prior to declaring the tilt, comparing the event to one or more tilt conditions.

68. The computer readable medium of claim 64, wherein in the method further comprises:

locking-out the gaming machine to game play.

69. A computer readable medium containing executable computer program instructions which when executed by a digital processing system cause the system to perform a method for clearing a tilt declared on a gaming machine, the method comprising:

receiving an event at a tilt controller;

communicating the event from the tilt controller to a tilt manager, the tilt manager further comprising a tilt handler list and a tilt list, the tilt handler list comprising a list of tilt handlers associated with the tilt manager, the tilt list comprising a list of tilts that identifies tilt objects that have not been cleared in the gaming machine;

communicating the event from the tilt manager to each of the tilt objects identified as tilts on the tilt list;

updating the state of each tilt object based upon the event and in accordance with the regulations of a gaming jurisdiction;

querying the tilt object by the tilt manager to determine if the tilt object is cleared;

communicating that the tilt object is cleared in response to a query from the tilt manager;

removing the cleared tilt object from the tilt list; and updating a tilt presentation loaded by the tilt manager to include an updated display of information associated with any remaining tilts.

70. The computer readable medium of claim 69, wherein the event is communicated to each tilt identified on the tilt list.

71. The computer readable medium of claim 69, wherein the tilt list is reprioritized prior to updating the tilt presentation so that data associated with the highest priority tilt is displayed.

72. The computer readable medium of claim 69, wherein prior to returning a cleared status, the tilt objects are queried after receipt of each received event, and the tilt presentation display data is updated.

73. A device for generating tilts in a gaming machine, the device comprising:

a first logic for detecting an event has occurred in a gaming machine an for communicating the event to a second logic; and a second logic for determining if the event constitutes a tilt and for generating a tilt if the event constitutes a tilt;

a third logic for responding to the tilt wherein the third logic is decoupled from the first logic and the second logic in a manner that allows the device to load the third logic that is in compliance with the regulations of a gaming jurisdiction in which the device is operating without altering the first logic and the second logic.

74. The device of claim 73, wherein the second logic generates a tilt presentation including tilt related data for display on the gaming machine.

* * * * *